United States Patent
Cidon et al.

(10) Patent No.: US 7,525,922 B2
(45) Date of Patent: *Apr. 28, 2009

(54) DUPLEX MISMATCH TESTING

(75) Inventors: Israel Cidon, Haifa (IL); Arie Kazatcker, Migdal Haemek (IL); Moshe Sidi, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 742 days.

This patent is subject to a terminal disclaimer.

(21) Appl. No.: 11/096,462

(22) Filed: Apr. 1, 2005

(65) Prior Publication Data

US 2006/0221843 A1    Oct. 5, 2006

(51) Int. Cl.
*H04L 12/26* (2006.01)

(52) U.S. Cl. .................. 370/242; 370/252; 709/224; 714/712

(58) Field of Classification Search ......... 370/241–253, 370/401, 468; 714/43, 46, 48, 712–717; 709/223–226
See application file for complete search history.

(56) References Cited

U.S. PATENT DOCUMENTS

| | | | |
|---|---|---|---|
| 5,477,531 A | 12/1995 | McKee et al. | |
| 5,648,965 A | 7/1997 | Thadani | |
| 5,678,002 A | 10/1997 | Fawcett et al. | |
| 5,812,529 A | 9/1998 | Czarnik et al. | |
| 5,838,919 A | 11/1998 | Schwaller et al. | |
| 5,881,237 A | 3/1999 | Schwaller et al. | |
| 5,958,010 A | 9/1999 | Agarwal et al. | |
| 6,006,268 A | 12/1999 | Coile et al. | |
| 6,029,258 A | 2/2000 | Ahmad | |
| 6,115,751 A | 9/2000 | Tam et al. | |
| 6,269,330 B1 | 7/2001 | Cidon et al. | |
| 6,327,620 B1 | 12/2001 | Tams et al. | |
| 6,363,053 B1 | 3/2002 | Schuster et al. | |
| 6,363,056 B1 * | 3/2002 | Beigi et al. ................. 370/252 |
| 6,385,204 B1 | 5/2002 | Hoefelmeyer et al. | |

(Continued)

FOREIGN PATENT DOCUMENTS

WO    WO 01/82022    11/2001

(Continued)

OTHER PUBLICATIONS

Rich Hernandez; Gigabit Ethernet Auto-Negotiation, Dell PowerSolutions (Issue 1, 2001), pp. 117-122.

(Continued)

*Primary Examiner*—Ricky Ngo
*Assistant Examiner*—Pao Sinkantarakorn
(74) *Attorney, Agent, or Firm*—Darby & Darby P.C.

(57) ABSTRACT

A method for testing a communication network includes transmitting at least one unidirectional flow over a path through the network, and measuring arrival characteristics of the least one unidirectional flow at a receiving end of the path. The arrival characteristics include at least one of a packet throughput characteristic, a packet delay characteristic, a packet loss characteristic, a packet jitter characteristic and a packet misordering characteristic. A bidirectional flow is transmitted over the path from both ends of the path simultaneously, and the arrival characteristics of the bidirectional flow are measured at least at one of the ends. The arrival characteristics of the unidirectional and bidirectional flows are compared in order to detect a fault in the path.

35 Claims, 3 Drawing Sheets

U.S. PATENT DOCUMENTS

| | | | |
|---|---|---|---|
| 6,397,359 B1 | 5/2002 | Chandra et al. | |
| 6,438,711 B2 | 8/2002 | Woodruff | |
| 6,467,041 B1 | 10/2002 | Blam | |
| 6,587,974 B1 * | 7/2003 | Majd et al. | 714/56 |
| 6,618,389 B2 | 9/2003 | Hoefelmeyer et al. | |
| 6,622,157 B1 | 9/2003 | Heddaya et al. | |
| 6,665,820 B1 | 12/2003 | Frowein et al. | |
| 6,697,962 B1 | 2/2004 | McCrory et al. | |
| 6,700,891 B1 | 3/2004 | Wong | |
| 6,845,394 B2 | 1/2005 | Ritche | |
| 6,865,691 B1 | 3/2005 | Brundridge et al. | |
| 6,883,118 B2 | 4/2005 | Morgan et al. | |
| 6,885,641 B1 * | 4/2005 | Chan et al. | 370/252 |
| 6,958,977 B1 | 10/2005 | Mitrani et al. | |
| 6,990,616 B1 * | 1/2006 | Botton-Dascal et al. | 714/715 |
| 2002/0144187 A1 | 10/2002 | Morgan et al. | |
| 2007/0195707 A1 * | 8/2007 | Cidon et al. | 370/252 |

FOREIGN PATENT DOCUMENTS

| | | |
|---|---|---|
| WO | WO 01/95053 | 12/2001 |

OTHER PUBLICATIONS http://www.ethermanage.com/ethernet/autoneg.html, Jan. 17, 2005 (2 pages).

http://www.cities.uiuc.edu/network/autosense.html 2005 (9 pages).

http://www.scyld.com/Nway.html 2005, (pp. 12).

DSLREPORTS.COM, http://web.archive.org/web/20001006044612/http://www.dslreports.com/stest/0, published by WaybackMachine, Oct. 6, 2000, (2 pages).

DSLREPORTS.COM, http://web.archive.org/web/20000620184719, published by WaybackMachine, Jun. 6, 2000, (2 pages).

* cited by examiner

DUPLEX MISMATCH TESTING

CROSS-REFERENCE TO RELATED APPLICATION

This application is related to U.S. patent application Ser. No. 09/557,256, filed Apr. 24, 2000, which is assigned to the assignee of the present patent application and whose disclosure is incorporated herein by reference.

FIELD OF THE INVENTION

The present invention relates generally to digital communication networks, and specifically to testing and discovery of configuration faults in communication networks.

BACKGROUND OF THE INVENTION

Ethernet standards now support a large range of different line speeds, from 10 to 1000 MHz, with the option of operating in either full duplex or half duplex mode. IEEE Standards 802.3 and 802.3ab define an auto-negotiation process by which a pair of Ethernet nodes at opposite ends of a link may advertise and negotiate the link speed and duplex mode (full or half) to be used on the link. A useful overview of the auto-negotiation process is provided by Hernandez in "Gigabit Ethernet Auto-Negotiation," *Dell™ Power Solutions* (Issue 1, 2001), pages 117-122, which is incorporated herein by reference.

Unfortunately the auto-negotiation process is not foolproof and sometimes results in duplex mismatch, i.e., situations in which the device at one end of a link is set for full-duplex operation and the other device is set for half-duplex. In this case, when both devices attempt to send frames over the link simultaneously, the half-duplex device will detect a collision on the link. Upon detecting the collision, the half-duplex device discards the incoming frame it has received and subsequently attempts to retransmit its own outgoing frame. The full-duplex device, on the other hand, may detect an error in its incoming frame but does not retransmit its own outgoing frame. This deviant link behavior causes applications using the link to time out and retransmit continually. As a result, the effective connection speed of the link is degraded.

Various tools are known in the art for automated testing of packet network performance. For example, U.S. Pat. No. 5,812,529, whose disclosure is incorporated herein by reference, describes a system and method for acquiring network performance data, built around a "mission server," which interfaces with clients to receive requests for "missions." A typical mission includes operations such as transmission and reception of data packets among devices connected to segments of the network. The mission is performed and/or supported by "sentries," typically software agents running on stand-alone network devices or end-points. The sentries carry out mission operations in response to commands from the mission server, and report back to the mission server on the mission results.

U.S. Pat. Nos. 5,838,919 and 5,881,237, whose disclosures are incorporated herein by reference, describe methods, systems and computer program products for testing of network performance using test scenarios that simulate actual communications traffic between network endpoints. Specific test protocols are assigned to endpoint nodes on the network. Typically, the nodes are paired, and one of the nodes in the pair communicates the protocol to the other, associated node. A console node sets up the test protocols, initiates their execution and receives data on the test performance from the endpoint nodes.

U.S. Pat. No. 6,269,330, whose disclosure is incorporated herein by reference, describes a method and apparatus for testing a network having a plurality of nodes. The method includes sending commands to one or more traffic agents connected to the network and to at least one network management agent coupled to a respective node of the network, transmitting data from at least one of the traffic agents over the network responsive to the commands, determining network information at the at least one network management agent responsive to the commands and to transmission of the data through the respective node, and receiving and evaluating the network information to assess a state of the network. Aspects of the methods described in U.S. Pat. No. 6,269,330 are embodied in an Active Testing Framework (ATF) known as NetAlly™, available from Viola Networks (Yokneam, Israel).

PCT Patent Publication WO 01/82022 A2, whose disclosure is incorporated herein by reference, describes a method for testing of a communication network using a plurality of traffic agents. The method includes transmitting a sequence of data packets via the network from a first traffic agent to a second traffic agent, and recording arrival characteristics of the packets responsively to receiving the packets at the second traffic agent. The arrival characteristics of different packets in the sequence are compared so as to determine a measure of variability in transmission of the packets via the network.

PCT Patent Publication WO 01/95053 A2, whose disclosure is incorporated herein by reference, describes a method for testing of a communication network using one or more network agents coupled to the network at respective locations. Data packets meeting a specified packet filtering criterion are transmitted through the network from one of the end-point to another. Packets meeting the criterion are intercepted using the network agents at one or more of the respective locations in the network traversed by the at least one of the data packets. Information regarding the intercepted packet is recorded and processed in order to analyze a route of the packets through the network.

SUMMARY OF THE INVENTION

Problems in duplex mode configuration can have a deleterious effect on all sorts of network applications, but particularly on applications that involve continuous, two-way communication traffic, such as Voice over Internet Protocol (VoIP). For good performance, such applications generally require consistent, full-duplex end-to-end packet flow. Duplex mismatch, as defined above, can cause noticeable degradation of application performance. Furthermore, even when the duplex mode across each individual link in the network is properly matched, the presence of a half-duplex link in what is otherwise supposed to be a full-duplex communication path can also degrade performance. Duplex configuration problems are difficult to diagnose, however, because the incorrectly-configured links continue to function (albeit poorly), and the application-level symptoms may be attributed to any number of different possible faults, which may arise at different points in the network.

In response to this difficulty, embodiments of the present invention provide tools and methods for discovering duplex configuration faults in a communication network. In these embodiments, a pair of nodes at opposite ends of a path through the network transmit both unidirectional and simultaneous bidirectional packet flows one to the other. For each flow, arrival characteristics of the packets, such as packet loss and delay, inter alia, are measured. Substantial differences between the unidirectional and bidirectional arrival characteristics are indicative of duplex configuration faults. The differences in arrival characteristics may be analyzed in order to indicate whether the fault is a problem of duplex mismatch or of a half-duplex link in the path.

There is therefore provided, in accordance with an embodiment of the invention, a method for testing a communication network, including:

transmitting at least one unidirectional flow over a path through the network, and measuring arrival characteristics of the least one unidirectional flow at a receiving end of the path, the arrival characteristics including at least one of a packet throughput characteristic, a packet delay characteristic, a packet loss characteristic, a packet jitter characteristic and a packet misordering characteristic;

transmitting a bidirectional flow over the path from both ends of the path simultaneously, and measuring the arrival characteristics of the bidirectional flow at least at one of the ends; and comparing the arrival characteristics of the unidirectional and bidirectional flows in order to detect a fault in the path.

In one embodiment, measuring the arrival characteristics includes measuring the packet loss characteristic, and comparing the arrival characteristics includes detecting the fault if the packet loss during the bidirectional flow is greater than the packet loss during the unidirectional flow. Additionally or alternatively, measuring the arrival characteristics includes measuring the packet delay characteristic, and comparing the arrival characteristics includes detecting the fault if the packet delay during the bidirectional flow is greater than the packet delay during the unidirectional flow.

Typically, comparing the arrival characteristics includes detecting a duplex mismatch on a link in the path.

Additionally or alternatively, comparing the arrival characteristics includes detecting existence of a half-duplex link in the path. In this case, transmitting the at least one unidirectional flow and transmitting the bidirectional flow may include transmitting first unidirectional and bidirectional flows in accordance with a first traffic profile in order to detect a duplex mismatch in the path and, if no duplex mismatch is detected, transmitting second unidirectional and bidirectional flows in accordance with a second traffic profile in order to detect the existence of the half-duplex link. In a disclosed embodiment, the first traffic profile defines a first load factor with respect to a line speed of the path, and the second traffic profile defines a second load factor, greater than the first load factor, with respect to the line speed.

In some embodiments, transmitting the at least one unidirectional flow and transmitting the bidirectional flow include transmitting User Datagram Protocol (UDP) packets.

Optionally, the method includes querying one or more network agents that are associated with nodes in the network along the path in order to identify a link in the path at which the fault has occurred.

In some embodiments, transmitting the at least one unidirectional flow and transmitting the bidirectional flow include transmitting data packets between first and second traffic agents deployed at respective first and second ends of the path.

In an alternative embodiment, transmitting the at least one unidirectional flow and transmitting the bidirectional flow include transmitting data packets from a traffic agent to a network device at the receiving end of the path so as to induce the network device to return response packets, and measuring the arrival characteristics includes receiving the response packets at the traffic agent, and processing the response packets to determine the arrival characteristics. Typically, the response packets include Internet Control Message Protocol (ICMP) messages.

There is also provided, in accordance with an embodiment of the invention, apparatus for testing a communication network, including:

first and second traffic agents, which are coupled to respective end points of a path through the network; and a testing center, which is coupled to instruct the traffic agents to transmit at least one unidirectional flow over a path through the network, and to measure arrival characteristics of the least one unidirectional flow at a receiving end of the path, the arrival characteristics including at least one of a packet throughput characteristic, a packet delay characteristic, a packet loss characteristic, a packet jitter characteristic and a packet misordering characteristic, and further to instruct the traffic agents to transmit a bidirectional flow over the path from both ends of the path simultaneously, and to measure the arrival characteristics of the bidirectional flow at least at one of the ends, wherein the testing center is operative to compare the arrival characteristics of the unidirectional and bidirectional flows in order to detect a fault in the path.

There is additionally provided, in accordance with an embodiment of the invention, a computer software product for testing a communication network in conjunction with at least one traffic agent, which is coupled to at least one respective end point of a path through the network, the product including a computer-readable medium in which program instructions are stored, which instructions, when read by a computer, cause the computer to instruct the at least one traffic agent to transmit at least one unidirectional flow over a path through the network, and to measure arrival characteristics of the least one unidirectional flow at a receiving end of the path, the arrival characteristics including at least one of a packet throughput characteristic, a packet delay characteristic, a packet loss characteristic, a packet jitter characteristic and a packet misordering characteristic, and further cause the computer to instruct the at least one traffic agent to transmit a bidirectional flow over the path from both ends of the path simultaneously, and to measure the arrival characteristics of the bidirectional flow at least at one of the ends, and further cause the computer to compare the arrival characteristics of the unidirectional and bidirectional flows in order to detect a fault in the path.

There is further provided, in accordance with an embodiment of the invention, a method for testing a communication network, including:

transmitting a first flow of first packets from a first endpoint of a path through the network to a network device at a second endpoint of the path, so as to cause the network device to return first response packets that are much shorter than the first packets;

processing the first response packets so as to assess arrival characteristics of the first flow, the arrival characteristics including at least one of a packet throughput characteristic, a packet delay characteristic, a packet loss characteristic, a packet jitter characteristic and a packet misordering characteristic;

transmitting a second flow of second packets over the path to the network device, so as to cause the network device to return second response packets that are of comparable length to the second packets;

processing the second response packets to as to assess the arrival characteristics of the second flow; and comparing the arrival characteristics of the first and second flows in order to detect a fault in the path.

In a disclosed embodiment, the response packets include Internet Control Message Protocol (ICMP) messages. Typically, transmitting the first flow includes directing the first packets to a port of the network device that is not open. Additionally or alternatively, the second packets include ICMP echo messages.

There is moreover provided, in accordance with an embodiment of the invention, apparatus for testing a communication network, including:

a traffic agent, which is coupled to a first end point of a path through the network; and a testing center, which is coupled to instruct the traffic agent to transmit a first flow of first packets to a network device at a second endpoint of the path, so as to cause the network device to return first response packets that are much shorter than the first packets, and to process the first response packets so as to assess arrival characteristics of the first flow, the arrival characteristics including at least one of a packet throughput characteristic, a packet delay characteristic, a packet loss characteristic, a packet jitter characteristic and a packet misordering characteristic, and further to instruct the traffic agent to transmit a second flow of second packets over the path to the network device, so as to cause the network device to return second response packets that are of comparable length to the second packets, and to process the second response packets to as to assess the arrival characteristics of the second flow, and to compare the arrival characteristics of the first and second flows in order to detect a fault in the path.

The present invention will be more fully understood from the following detailed description of the embodiments thereof, taken together with the drawings in which:

DETAILED DESCRIPTION OF EMBODIMENTS

Figure 1:
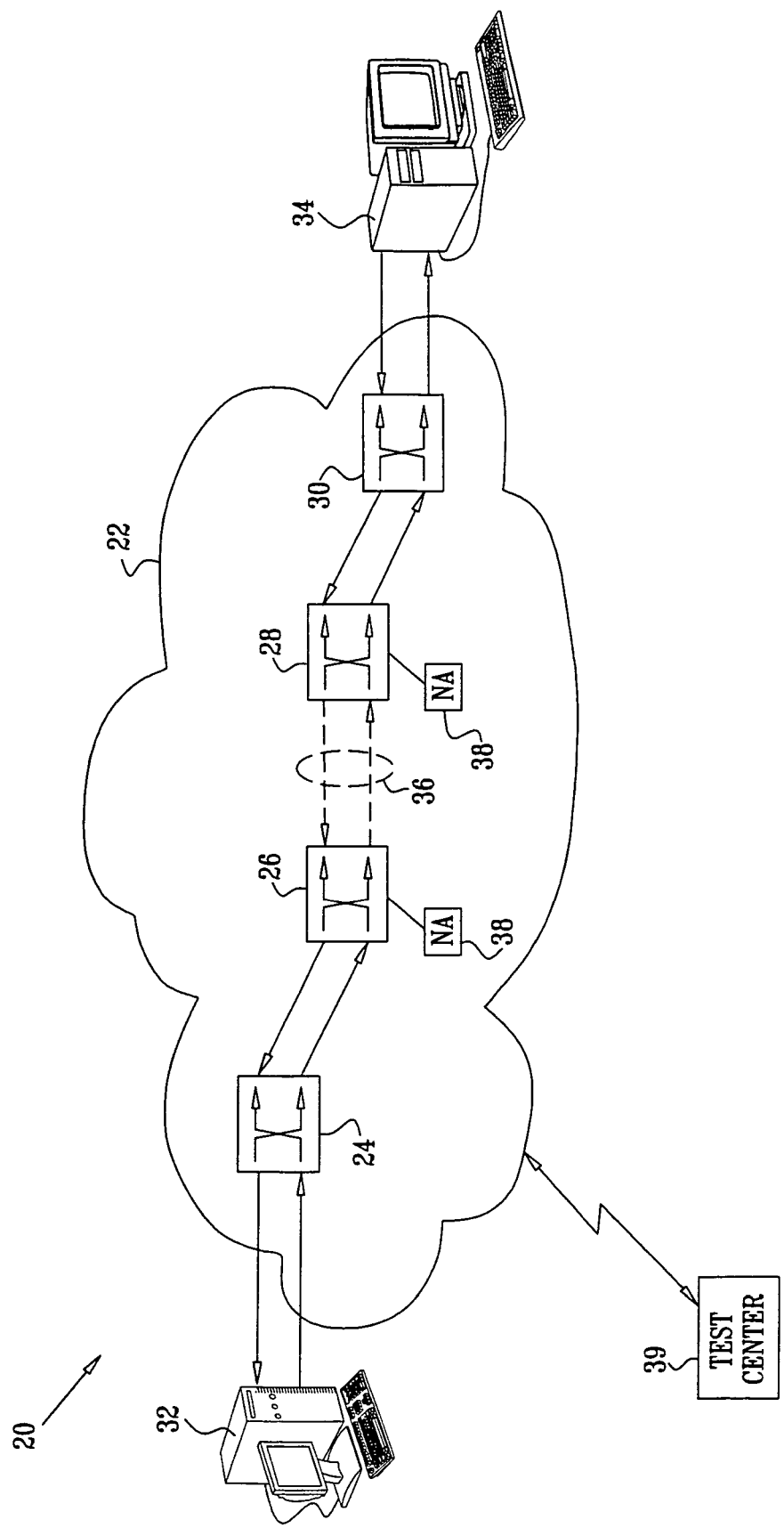
FIG. 1 is a block diagram that schematically illustrates a system for testing a communication network, in accordance with an embodiment of the present invention.

FIG. 1 is a block diagram that schematically illustrates a distributed testing system 20, which is used to perform diagnostic testing on a network 22, in accordance with an embodiment of the present invention. Network 22 may comprise substantially any sort of network known in the art that is capable of duplex transmission of data packets, such as a local- or wide-area network (LAN or WAN). In the embodiments described hereinbelow, network 22 is assumed to operate in accordance with Ethernet standards, as outlined in the Background of the Invention. Alternatively, the principles of the present invention may similarly be applied in testing networks of other types that allow links to be configured for full- or half-duplex operation.

In the present example, network 22 comprises switching hardware, represented schematically in FIG. 1 as switches 24, 26, 28 and 30. Typically, the switches comprises LAN hubs or Internet Protocol (IP) routers with Ethernet interface ports, as are known in the art, although the principles of the present invention are also applicable in other protocol environments, with switching hardware of other types. Switches 24, 26, 28 and 30 define a communication path through network 22. In this simplified example, the path is defined uniquely by the sequence of switches. This sort of static path definition is usually the case in Internet Protocol (IP) routing, wherein the shortest path is chosen by an internal routing protocol (e.g., OSPF, IS-IS, RIP, EIGRP) or an external routing protocol (e.g., EGP, BGP), as is known in the art. Alternatively, when more dynamic IP routing is used, the path may change from time to time 22. In any case, the path is intended by the network operator to function in full-duplex mode from end to end. In this case, however, a link 36 between nodes 26 and 28 is incorrectly configured and therefore does not provide the desired full-duplex operation.

Testing system 20 comprises nodes that are configured as end-point traffic agents 32 and 34, which are coupled respectively to ports of switches 24 and 30 at the end points of the path through network 22. Typically, traffic agents 32 and 34 serve as both traffic generators, transmitting packets through the network, and as traffic analyzers, receiving packets and assembling information regarding the received packets, as described in detail hereinbelow. The traffic agents are typically implemented as software processes running on host computers connected to the network. Some or all of the hosts may comprise add-on hardware devices to accommodate the needs of the traffic agents. Further alternatively or additionally, the traffic agents may be implemented as stand-alone devices, independent of host computers.

Testing system 20 may also comprise one or more network agents 38, which are associated with one or more of the switches in network 22 (in this example, switches 26 and 28). These and other aspects of testing systems using traffic agents and network agents are described in the above-mentioned U.S. Pat. No. 6,269,330 and PCT Patent Publications WO 01/82022 and WO 01/95053.

System 20 further comprises a testing center 39, which is typically implemented as a software process executed at a network management host. Testing center 39 may run on the same host as one of traffic agents 32 and 34. The software for the testing center, as well as software for carrying out the functions of the traffic agents, is typically conveyed to the respective computers via network 22. Alternatively or additionally, the software may be supplied on tangible media, such as CD-ROM, for installation on the respective computers. Typically, testing center 39 communicates through network 22 with one or more of the traffic agents, as well as with network agents 38. Alternatively or additionally, different communication means, independent of network 22, such as modem dialup lines or separate Internet connections, may be used to communicate with some or all of the traffic agents.

Testing center 39 typically conducts the tests that are described hereinbelow by transmitting appropriate commands to traffic agents 32 and 34 and, optionally, to network agents 38. Subsequently the testing center receives reports from the agents. The testing center processes the reports, evaluates network 22 based on the reports, and displays the test results to a network operator. The tests may be initiated by the operator, or they may be carried out automatically by the test center when a fault condition is suspected. When the tests are carried out automatically, and a fault condition is detected, the testing center may generate an alarm in order to notify the operator that a fault has occurred.

Figure 2A:
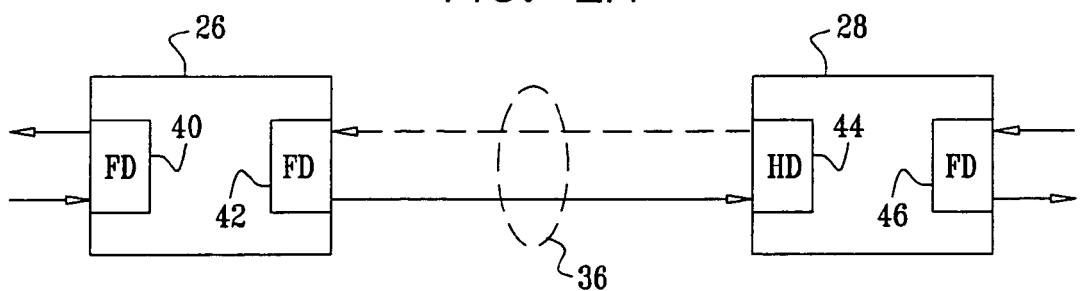
FIGS. 2A and 2B are block diagrams that schematically show details of a communication network, illustrating characteristic duplex configuration faults that may be detected in the network in accordance with embodiments of the present invention.
Figure 2B:
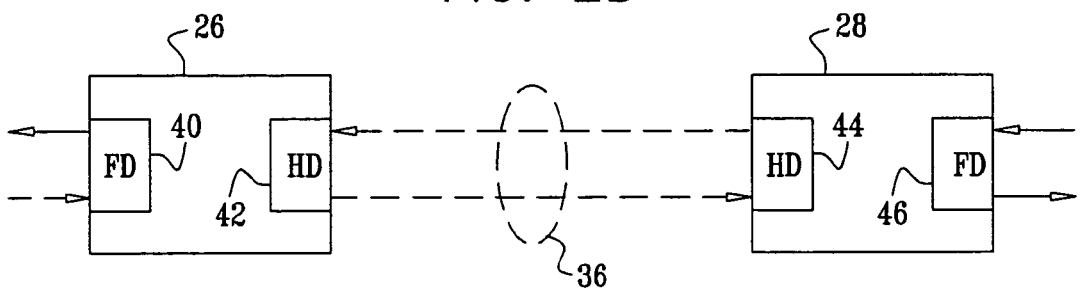

FIGS. 2A and 2B schematically illustrate duplex configuration faults that may be detected on link 36 by test system 20, in accordance with an embodiment of the present invention. Switch 26 comprises ports 40 and 42, while switch 28 comprises ports 44 and 46. Link 36 connects ports 42 and 44.

In the example shown in FIG. 2A, all the ports are configured for full-duplex (FD) operation, with the exception of port 44. This situation is referred to herein as a duplex mismatch. Such a mismatch might occur, for instance, if the system operator has inadvertently configured port 44 incorrectly. It could also occur if the system operator configured port 42 correctly, but left the configuration of port 44 to auto-negotiation. In this case, port 44 will receive no response from port 42 during the auto-negotiation sequence (since port 42 is pre-configured) and will therefore default to half-duplex (HD). Duplex mismatch may also arise from other faults in the auto-negotiation process. Regardless of the cause, the mismatch on link 36 will lead to substantial packet loss on the link under conditions of even moderate two-way traffic, due primarily to packet collisions occurring at port 44. When only one-way traffic is transmitted over the path through network 22, however, the duplex mismatch should have little effect on network performance.

In FIG. 2B, both of ports 42 and 44 have been configured as half-duplex, so that link 36 operates properly as a half-duplex link. The remaining links in the path through network 22, however, are configured for full-duplex operation, and the path is expected to carry full-duplex traffic. The half-duplex link will have little or no effect on network performance under conditions of unidirectional traffic or light bidirectional traffic. Under heavy bidirectional traffic conditions, however, the effective bandwidth of link 36 will be reduced, so that packets will be delayed at ports 42 and 44. As the traffic load increases further, the buffers at ports 42 and 44 will begin to overflow, leading to packet loss, as well.

Figure 3:
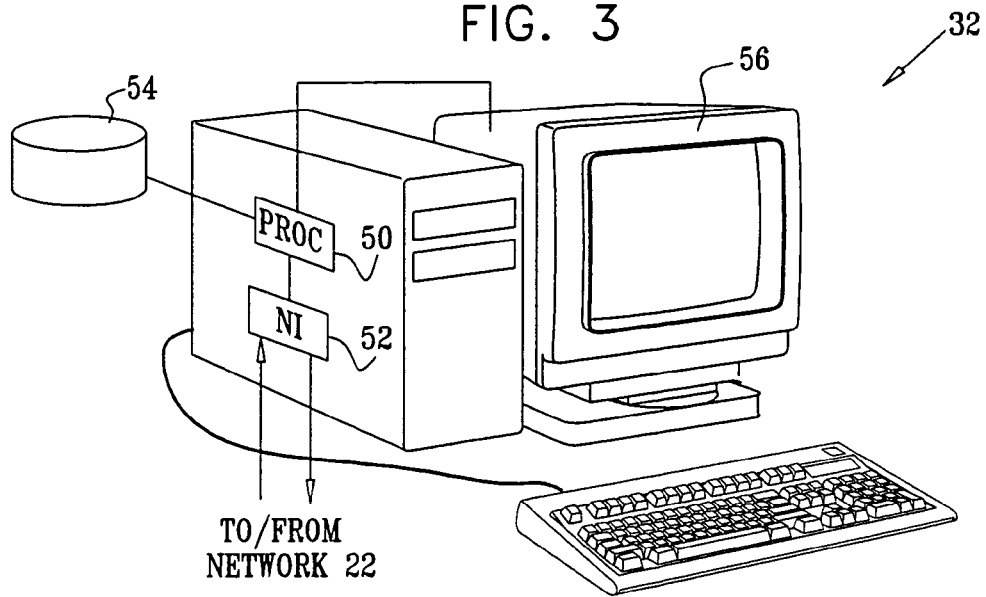
FIG. 3 is a block diagram that schematically illustrates a traffic agent, in accordance with an embodiment of the present invention.

FIG. 3 is a block diagram that schematically shows details of traffic agent 32, in accordance with an embodiment of the present invention. Traffic agent 34 and testing center 39 may be similarly constructed. As noted above, the traffic agent typically comprises a computer, which comprises a processor 50 and a network interface 52 for communicating with network 22. When the traffic agent conducts a test, processor 50 stores test results in a memory 54 and then processes and passes the results to the testing center for analysis. The results of the analysis are displayed on an output device 56, such as a computer monitor.

Figure 4:
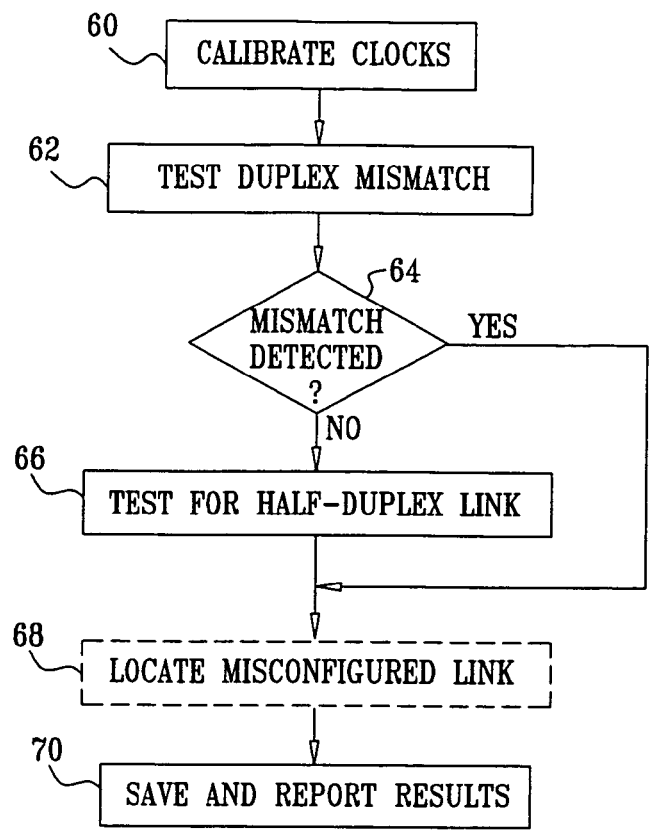
FIG. 4 is a flow chart that schematically illustrates a method for detecting duplex configuration faults in a network, in accordance with an embodiment of the present invention.

FIG. 4 is a flow chart that schematically illustrates a method for detecting duplex configuration faults in network 22, in accordance with an embodiment of the present invention. The test uses traffic agents 32 and 34 to transmit and measure arrival characteristics of unidirectional and bidirectional flows of packets through network 22. Typically, the measured arrival characteristics include one or more of the following measurements: packet loss, throughput, delay, jitter (variability of delay) and misordering (i.e., receipt of packets out of order, relative to the order of transmission). Exemplary methods for measuring these characteristics are described in the above-mentioned PCT Patent Publication WO 01/82022 A2 and the corresponding U.S. patent application Ser. No. 09/557,256. Alternatively or additionally, other arrival characteristics may be measured, and other measurement methods may be used.

Because some of the measured arrival characteristics, such as the delay, are time-dependent, the local clocks of the traffic agents are calibrated before carrying out the actual tests, at a clock calibration step 60. For this purpose, traffic agent 32 transmits a stream of packets, typical User Datagram Protocol (UDP) packets, to traffic agent 34, and traffic agent 34 echoes the packets back to traffic agent 32. Each traffic agent adds a timestamp to each packet that it sends, indicating the time of transmission, and records the times of arrival of the packets that it receives. By comparing the transmission timestamps to the arrival times of the packets at each traffic agent, a raw (uncalibrated) average one-way path delay may be calculated. Under light traffic conditions, the queuing delay along the path is small in both directions. The propagation delay, which is not affected by the traffic, is either small (when traversing a LAN, for example) or is at least approximately symmetrical (typical in WANs, in which routing decisions are symmetrical). Therefore, in such situations, the difference in the average raw one-way path delays measured by the two traffic agents is indicative of the clock offset between the two traffic agents and the symmetrical propagation delay. This clock offset is computed based on the measured path delays and is used subsequently in accurately measuring the path delay under heavy traffic.

Once the clocks have been calibrated, testing center 39 instructs traffic agents 32 and 34 to test for duplex mismatch on the path between the traffic agents, at a mismatch testing step 62. Details of this step are described below with reference to FIG. 5. Briefly, the test entails comparing the arrival characteristics, particularly the packet loss, of unidirectional traffic to those of bidirectional traffic. If there is a substantial difference, testing center 39 determines that there is a duplex mismatch on one (or possibly more) of the links in the path, at a mismatch detection step 64.

If there is no duplex mismatch, testing center 39 discards the test results from step 62, and instructs the traffic agents to test for a half-duplex link in the path, at a half-duplex link testing step 66. This step, like step 62, involves transmission of unidirectional and bidirectional traffic between traffic agents 32 and 34, and measuring the arrival characteristics, particularly packet loss and delay, under both types of traffic conditions. The types of tests carried out at step 66 are thus similar to those performed at step 62, but different test parameters are applied.

If a duplex mismatch or half-duplex link problem was detected at step 62 or step 66, testing center 39 may optionally perform detailed network testing to discover the specific link that is improperly configured, at a link location step 68. For this purpose, the testing center may activate network agents 38 to collect local results on packet loss and/or delay during the test, for example, and then to report the results to the testing center. By analyzing the results, the testing center is able to locate the bottleneck in network 22. Methods that may be used for this purpose are described in detail in the above-mentioned U.S. Pat. No. 6,269,330 and PCT Patent Publication WO 01/95053 A2 and in the corresponding U.S. patent application Ser. No. 09/587,913, filed Jun. 6, 2000, whose disclosure is incorporated herein by reference.

If a duplex configuration problem was discovered at step 62 or 66, the testing center saves the test results in a database and reports the results to the system operator, at a reporting step 70. The location of the problem, if found at step 68, may also be reported.

Figure 5:
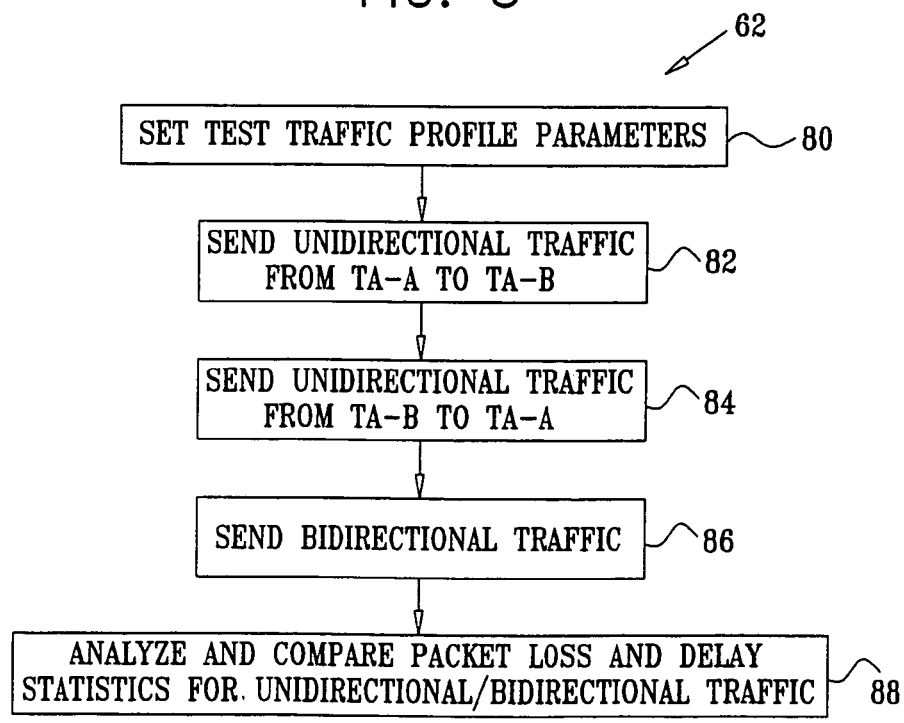
FIG. 5 is a flow chart that schematically illustrates a method for detecting duplex mismatch, in accordance with an embodiment of the present invention.

FIG. 5 is a flow chart that schematically shows details of mismatch testing step 62, in accordance with an embodiment of the present invention. Step 66 follows similar lines as step 62, except that a different traffic profile is used. The traffic profile parameters are set by testing center 39, at a profile setting step 80. For example, the traffic profile may call for sending 10,000 UDP packets, spaced 0.20 ms apart, at each step of the method that follows. The packet size is determined by the speed for which the network path is supposed to be configured and the load factor to be used during the test steps. For example, assuming the path to be configured for 100 Mbps, a test load factor of 40% means that 40 Mbps are to be transmitted over the path in the appropriate direction or in both directions (for bidirectional testing) during each step of the test. The size of each test packet will then be 1000 bytes (including 28 bytes of IP and UDP overhead). A test load factor of 30% is typical for duplex mismatch testing, while a 60% test load factor or higher may be used for half-duplex link testing at step 66. Alternatively, different traffic profile parameters may be chosen, depending on network characteristics and the desired test sensitivity.

To begin the actual test, testing center 39 instructs one of the traffic agents (referred to in FIG. 5 as TA-A) to transmit a unidirectional traffic stream to the other traffic agent (TA-B) in accordance with the traffic profile parameters, at a first unidirectional transmission step 82. TA-B measures the arrival characteristics of the stream, particularly the packet loss. During step 82, TA-B refrains from transmitting packets over the path under test. This procedure is repeated in the opposite direction, from TA-B to TA-A, at a second unidirectional transmission step 84. Alternatively, it may be sufficient to transmit the unidirectional traffic in only a single direction, and to skip step 84.

Testing center 39 instructs both traffic agents to transmit simultaneous, bidirectional traffic over the path, at a bidirectional transmission step 86. (The order of steps 82, 84 and 86 in FIG. 5 is arbitrary, and these steps may be carried out in any desired order.) The term "bidirectional," as used in the context of the present patent application and in the claims, does not mean that one traffic agent necessarily responds to the traffic sent by the other traffic agent, but only that both traffic agents transmit simultaneously in different directions over the same path. The traffic agents simultaneously measure the arrival characteristics of the packets that they receive. Alternatively, although both of the traffic agents transmit packets at step 86, it may be sufficient at this step for only one of the traffic agents to actually measure and record the arrival characteristics, since duplex configuration problems will typically be manifested in both directions of traffic flow.

The traffic agents report their measurements of packet arrival characteristic during steps 82, 84 and 86 to the testing center. The testing center then analyzes and compares the unidirectional characteristics from steps 82 and 84 to the bidirectional characteristics from step 86, at an analysis step 88. In particular, if the entire path is properly configured for full-duplex operation, it is expected that the packet loss statistics will be roughly the same at both the unidirectional and bidirectional steps. Typically, if the path is loss-free during unidirectional transmission, then packet loss in excess of a certain threshold, such as 0.1%, during bidirectional transmission can be considered indicative of a duplex configuration problem. If the fraction of packets lost during unidirectional transmission is non-zero, but the fraction of packets lost during bidirectional transmission exceeds the unidirectional fraction by more than a certain threshold percentage, the testing center may also conclude that a duplex configuration problem exists. Typically, the threshold percentage is set to 10% for duplex mismatch testing and 5% for half-duplex link testing for the exemplary test load factors given above.

If the bidirectional packet loss statistics are within the applicable thresholds, the testing center typically reports at step 70 that no duplex configuration problems have been detected. Alternatively or additionally, the testing center may analyze other packet arrival characteristics. For example, a half-duplex link problem may manifest itself as an increase in average packet delay at step 86. Thus, if the testing center detects that the delay under bidirectional traffic conditions is substantially greater than that measured during unidirectional transmission, it may report the existence of a half-duplex link even if the packet loss was within the permitted bounds.

Although the embodiments described above use traffic agents at both ends of the path under evaluation, similar sorts of tests may be performed using a single traffic agent at one network node, in communication with a network device that does not include a traffic agent at another network node. The traffic agent sends streams of data packets to the network device in such a way as to induce the network device to return response packets, and then processes the response packets to determine the packet arrival characteristics under different conditions. Typically, the data packets transmitted by the traffic agent are structured based on standard network protocols so as to require the network device to respond, without the need for any application-level programming of the network device.

This alternative testing configuration may be implemented, for example, using the features of the Internet Control Message Protocol (ICMP), which is the part of the IP protocol that handles error and control messages. (ICMP is defined by Request for Comments (RFC) 792 of the Internet Engineering Task Force.) In this alternative embodiment, the unidirectional and bidirectional traffic flows are created as follows:

For unidirectional traffic measurement, the traffic agents transmits a stream of large UDP packets (1000 bytes per packet, for example) to a port of the network device that is not open. Upon receiving each of these "erroneous" packets, the network device will generate a short ICMP error message. Specifically, in accordance with RFC 792, the device will answer each packet with a Type 3/Code 3 ICMP message (port unreachable) containing the Internet header and 64 bits of the original data packet. The traffic agent receives and processes these ICMP messages in order to evaluate the arrival characteristics of the UDP packets at the network device. Since the ICMP packets are much shorter than the UDP packets, the traffic flow between the traffic agent and the network device remains essentially unidirectional.

For full duplex traffic measurement, the traffic agent sends the network device a stream of ICMP echo (type 8) packets with a large data payload. In accordance with RFC 792, the network device will return an ICMP echo reply (type 0) packet in response to each of the type 8 packets. Each echo reply packet contains the same data payload as the type 8 packet to which it responds, and is therefore of comparable length to the type 8 packet. (Alternatively, the traffic agent may transmit a stream of UDP echo packets if the UDP echo service is enabled on the network device.) The traffic agent measures the arrival characteristics of the echo reply packets under these full duplex conditions.

The testing center compares the arrival characteristics, and particularly the percentage of packets lost in the two phases of the test, in order to detect duplex configuration problems in the manner described above.

Although the embodiments described above relate specifically to detection of duplex configuration faults in Ethernet networks, the principles of the present invention may similarly be applied in detecting half-duplex behaviors in other environments, such as wireless radio networks (for example, 802.11 wireless LANs) or ADSL networks. Furthermore, although these embodiments relate to testing of a simple linear path between two end points, the principles of the present invention may also be applied, mutatis mutandis, to testing for configuration faults in more complex paths, including path topologies having three or more participating end points. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for testing a communication network, comprising:

transmitting at least one unidirectional flow over a path through the network, and measuring arrival characteristics of the at least one unidirectional flow at a receiving end of the path, the arrival characteristics comprising a packet loss characteristic;

transmitting a bidirectional flow over the path from both ends of the path simultaneously, and measuring the arrival characteristics of the bidirectional flow at least at one of the ends; and comparing the arrival characteristics of the unidirectional and bidirectional flows in order to detect a fault in the path, wherein comparing the arrival characteristics comprises detecting the fault if the packet loss during the bidirectional flow is greater than the packet loss during the unidirectional flow.

2. The method according to claim 1, wherein comparing the arrival characteristics comprises detecting a duplex mismatch on a link in the path.

3. The method according to claim 1, wherein comparing the arrival characteristics comprises detecting existence of a half-duplex link in the path.

4. The method according to claim 1, wherein transmitting the at least one unidirectional flow and transmitting the bidirectional flow comprise transmitting User Datagram Protocol (UDP) packets.

5. The method according to claim 1, and comprising querying one or more network agents that are associated with nodes in the network along the path in order to identify a link in the path at which the fault has occurred.

6. The method according to claim 1, wherein transmitting the at least one unidirectional flow and transmitting the bidirectional flow comprise transmitting data packets between first and second traffic agents deployed at respective first and second ends of the path.

7. The method according to claim 1, wherein transmitting the at least one unidirectional flow and transmitting the bidirectional flow comprise transmitting data packets from a traffic agent to a network device at the receiving end of the path so as to induce the network device to return response packets, and wherein measuring the arrival characteristics comprises receiving the response packets at the traffic agent, and processing the response packets to determine the arrival characteristics.

8. The method according to claim 7, wherein the response packets comprise Internet Control Message Protocol (ICMP) messages.

9. A method for testing a communication network, comprising:

transmitting at least one unidirectional flow over a path through the network, and measuring arrival characteristics of the at least one unidirectional flow at a receiving end of the path, the arrival characteristics comprising a packet delay characteristic;

transmitting a bidirectional flow over the path from both ends of the path simultaneously, and measuring the arrival characteristics of the bidirectional flow at least at one of the ends; and comparing the arrival characteristics of the unidirectional and bidirectional flows in order to detect a fault in the path, wherein comparing the arrival characteristics comprises detecting the fault if the packet delay during the bidirectional flow is greater than the packet delay during the unidirectional flow.

10. A method for testing a communication network, comprising:

transmitting at least one unidirectional flow over a path through the network, and measuring arrival characteristics of the at least one unidirectional flow at a receiving end of the path, the arrival characteristics comprising at least one of a packet throughput characteristic, a packet delay characteristic, a packet loss characteristic, a packet jitter characteristic and a packet misordering characteristic;

transmitting a bidirectional flow over the path from both ends of the path simultaneously, and measuring the arrival characteristics of the bidirectional flow at least at one of the ends; and comparing the arrival characteristics of the unidirectional and bidirectional flows in order to detect a fault in the path, wherein comparing the arrival characteristics comprises detecting existence of a half-duplex link in the path, and wherein transmitting the at least one unidirectional flow and transmitting the bidirectional flow comprise transmitting first unidirectional and bidirectional flows in accordance with a first traffic profile in order to detect a duplex mismatch in the path and, if no duplex mismatch is detected, transmitting second unidirectional and bidirectional flows in accordance with a second traffic profile in order to detect the existence of the half-duplex link.

11. The method according to claim 10, wherein the first traffic profile defines a first load factor with respect to a line speed of the path, and the second traffic profile defines a second load factor, greater than the first load factor, with respect to the line speed.

12. An apparatus for testing a communication network, comprising:

first and second traffic agents, which are coupled to respective end points of a path through the network; and a testing center, which is coupled to instruct the traffic agents to transmit at least one unidirectional flow over a path through the network, and to measure arrival characteristics of the at least one unidirectional flow at a receiving end of the path, the arrival characteristics comprising a packet loss characteristic, and further to instruct the traffic agents to transmit a bidirectional flow over the path from both ends of the path simultaneously, and to measure the arrival characteristics of the bidirectional flow at least at one of the ends, wherein the testing center is operative to compare the arrival characteristics of the unidirectional and bidirectional flows in order to detect a fault in the path, and wherein the testing center is configured to detect the fault if the packet loss during the bidirectional flow is greater than the packet loss during the unidirectional flow.

13. The apparatus according to claim 12, wherein the fault detected by the testing center comprises a duplex mismatch on a link in the path.

14. The apparatus according to claim 12, wherein the fault detected by the testing center comprises a half-duplex link in the path.

15. The apparatus according to claim 12, wherein the at least one unidirectional flow and the bidirectional flow comprise User Datagram Protocol (UDP) packets.

16. The apparatus according to claim 12, and comprising one or more network agents that are associated with nodes in the network along the path, wherein the testing center is coupled to query the one or more network agents in order to identify a link in the path at which the fault has occurred.

17. An apparatus for testing a communication network, comprising:

first and second traffic agents, which are coupled to respective end points of a path through the network; and a testing center, which is coupled to instruct the traffic agents to transmit at least one unidirectional flow over a path through the network, and to measure arrival characteristics of the at least one unidirectional flow at a receiving end of the path, the arrival characteristics comprising a packet delay characteristic, and further to instruct the traffic agents to transmit a bidirectional flow over the path from both ends of the path simultaneously, and to measure the arrival characteristics of the bidirectional flow at least at one of the ends, wherein the testing center is operative to compare the arrival characteristics of the unidirectional and bidirectional flows in order to detect a fault in the path, wherein the testing center is configured to detect the fault if the packet delay during the bidirectional flow is greater than the packet delay during the unidirectional flow.

18. An apparatus for testing a communication network, comprising:

first and second traffic agents, which are coupled to respective end points of a path through the network; and a testing center, which is coupled to instruct the traffic agents to transmit at least one unidirectional flow over a path through the network, and to measure arrival characteristics of the at least one unidirectional flow at a receiving end of the path, the arrival characteristics comprising at least one of a packet throughput characteristic, a packet delay characteristic, a packet loss characteristic, a packet jitter characteristic and a packet misordering characteristic, and further to instruct the traffic agents to transmit a bidirectional flow over the path from both ends of the path simultaneously, and to measure the arrival characteristics of the bidirectional flow at least at one of the ends, wherein the testing center is operative to compare the arrival characteristics of the unidirectional and bidirectional flows in order to detect a fault in the path, wherein the fault detected by the testing center comprises a half-duplex link in the path, and wherein the at least one unidirectional flow and the bidirectional flow transmitted by the traffic agents comprise first unidirectional and bidirectional flows that are transmitted in accordance with a first traffic profile in order to detect a duplex mismatch in the path and second unidirectional and bidirectional flows that are transmitted in accordance with a second traffic profile if no duplex mismatch is detected in order to detect the existence of the half-duplex link.

19. The apparatus according to claim 18, wherein the first traffic profile defines a first load factor with respect to a line speed of the path, and the second traffic profile defines a second load factor, greater than the first load factor, with respect to the line speed.

20. A computer software product for testing a communication network in conjunction with at least one traffic agent, which is coupled to at least one respective end point of a path through the network, the product comprising a computer-readable medium in which program instructions are stored, which instructions, when read by a computer, cause the computer to instruct the at least one traffic agent to transmit at least one unidirectional flow over a path through the network, and to measure arrival characteristics of the at least one unidirectional flow at a receiving end of the path, the arrival characteristics comprising at least one of a packet throughput characteristic, a packet delay characteristic, a packet loss characteristic, a packet jitter characteristic and a packet misordering characteristic, and further cause the computer to instruct the at least one traffic agent to transmit a bidirectional flow over the path from both ends of the path simultaneously, and to measure the arrival characteristics of the bidirectional flow at least at one of the ends, and further cause the computer to compare the arrival characteristics of the unidirectional and bidirectional flows in order to detect a fault in the path, wherein the instructions cause the computer to detect the fault if the packet loss during the bidirectional flow is greater than the packet loss during the unidirectional flow or if the packet delay during the bidirectional flow is greater than the packet delay during the unidirectional flow.

21. The product according to claim 20, wherein the fault detected by the computer comprises a duplex mismatch on a link in the path.

22. The product according to claim 20, wherein the fault detected by the computer comprises a half-duplex link in the path.

23. The product according to claim 22, wherein the at least one unidirectional flow and the bidirectional flow transmitted by the at least one traffic agent comprise first unidirectional and bidirectional flows that are transmitted in accordance with a first traffic profile in order to detect a duplex mismatch in the path and second unidirectional and bidirectional flows that are transmitted in accordance with a second traffic profile if no duplex mismatch is detected in order to detect the existence of the half-duplex link.

24. The product according to claim 23, wherein the first traffic profile defines a first load factor with respect to a line speed of the path, and the second traffic profile defines a second load factor, greater than the first load factor, with respect to the line speed.

25. The product according to claim 20, wherein the at least one unidirectional flow and the bidirectional flow comprise User Datagram Protocol (UDP) packets.

26. The product according to claim 20, wherein the instructions cause the computer to query one or more network agents that are associated with nodes in the network along the path in order to identify a link in the path at which the fault has occurred.

27. The product according to claim 20, wherein the at least one traffic agent includes first and second traffic agents deployed at respective first and second ends of the path, and wherein the instructions cause the computer to instruct the first and second traffic agents to transmit and receive the at least one unidirectional flow and the bidirectional flow.

28. The product according to claim 20, wherein the instructions cause the computer to instruct the at least one traffic agent to transmit data packets to a network device at the receiving end of the path so as to induce the network device to return response packets to the at least one traffic agent, and to process the response packets to determine the arrival characteristics.

29. The product according to claim 28, wherein the response packets comprise Internet Control Message Protocol (ICMP) messages.

30. A method for testing a communication network, comprising:
   transmitting a first flow of first packets from a first endpoint of a path through the network to a network device at a second endpoint of the path, so as to cause the network device to return first response packets that are much shorter than the first packets;
   processing the first response packets so as to assess arrival characteristics of the first flow, the arrival characteristics comprising at least one of a packet throughput characteristic, a packet delay characteristic, a packet loss characteristic, a packet jitter characteristic and a packet misordering characteristic;
   transmitting a second flow of second packets over the path to the network device, so as to cause the network device to return second response packets that are of comparable length to the second packets;
   processing the second response packets to as to assess the arrival characteristics of the second flow; and
   comparing the arrival characteristics of the first and second flows in order to detect a fault in the path.

31. The method according to claim 30, wherein the fault comprises a duplex configuration fault.

32. The method according to claim 30 wherein the response packets comprise Internet Control Message Protocol (ICMP) messages.

33. The method according to claim 32, wherein transmitting the first flow comprises directing the first packets to a port of the network device that is not open.

34. The method according to claim 32 wherein the second packets comprise ICMP echo messages.

35. An apparatus for testing a communication network, comprising:
   a traffic agent, which is coupled to a first end point of a path through the network; and
   a testing center, which is coupled to instruct the traffic agent to transmit a first flow of first packets to a network device at a second endpoint of the path, so as to cause the network device to return first response packets that are much shorter than the first packets, and to process the first response packets so as to assess arrival characteristics of the first flow, the arrival characteristics comprising at least one of a packet throughput characteristic, a packet delay characteristic, a packet loss characteristic, a packet jitter characteristic and a packet misordering characteristic, and further to instruct the traffic agent to transmit a second flow of second packets over the path to the network device, so as to cause the network device to return second response packets that are of comparable length to the second packets, and to process the second response packets to as to assess the arrival characteristics of the second flow, and to compare the arrival characteristics of the first and second flows in order to detect a fault in the path.

\* \* \* \* \*